M. S. HOPKINS.
FILTER.
APPLICATION FILED APR. 12, 1912.
1,047,413.
Patented Dec. 17, 1912.
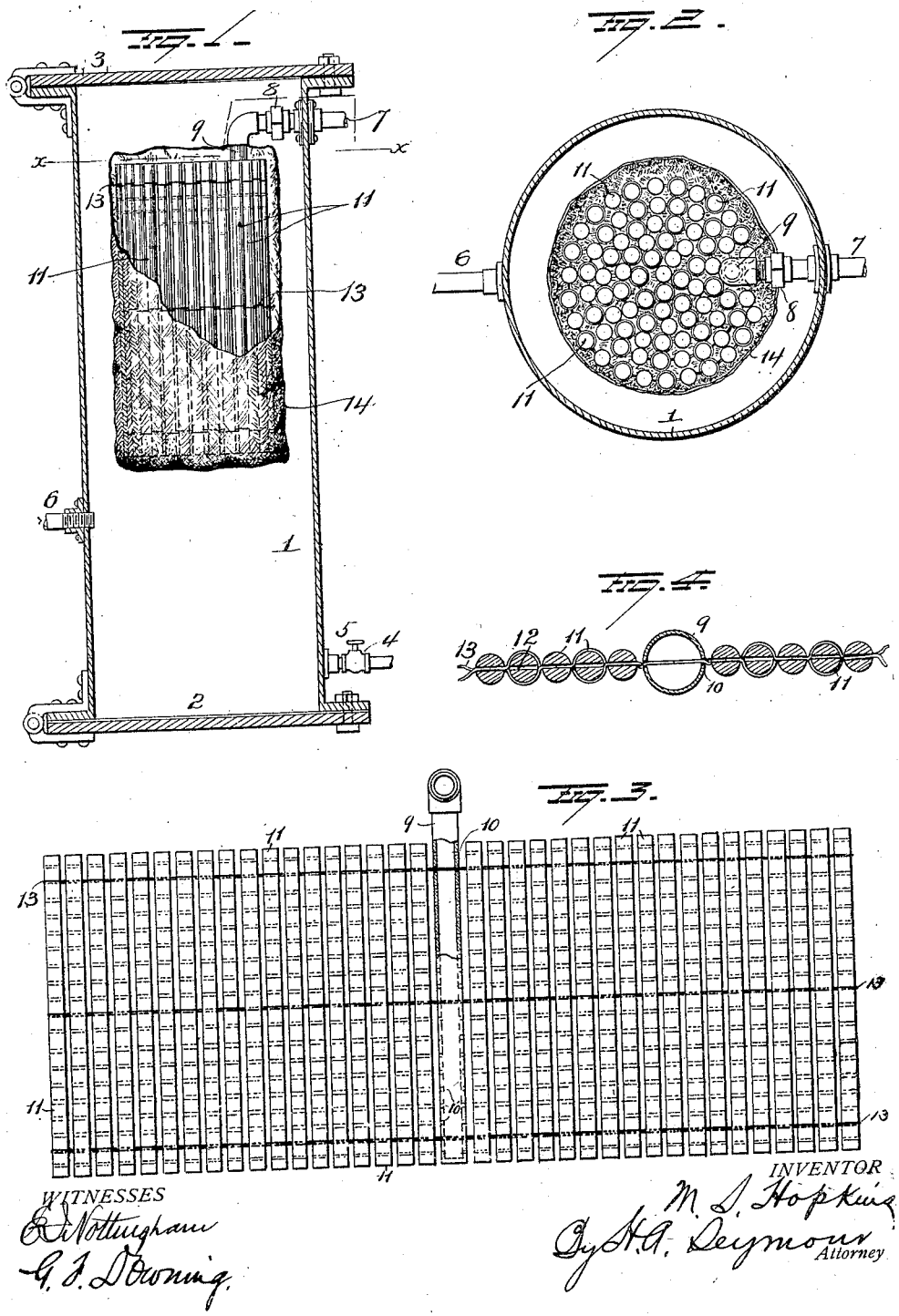
WITNESSES
INVENTOR
M. S. Hopkins
By H. A. Seymour, Attorney

UNITED STATES PATENT OFFICE.

MATHEW S. HOPKINS, OF HIGHLAND, MARYLAND.

FILTER.

1,047,413.

Specification of Letters Patent. Patented Dec. 17, 1912.

Application filed April 12, 1912. Serial No. 690,437.

*To all whom it may concern:*

Be it known that I, MATHEW S. HOPKINS, a citizen of the United States, residing at Highland, in the county of Howard and State of Maryland, have invented certain new and useful Improvements in Filters; and I do hereby declare the following to be a full, clear, and exact description of the invention, such as will enable others skilled in the art to which it appertains to make and use the same.

This invention relates to improvements in filters and more particularly to such as will operate and separate water and foreign matter from such liquid as benzin,—the object of the invention being to provide a filter of the character described, that shall be compact in structure and at the same time have a maximum working capacity, and which shall operate to effectually separate fluid, such as benzin, from a mixture or an emulsion containing the same.

With this object in view the invention consists in certain novel features of construction and combinations of parts as hereinafter set forth and pointed out in the claims.

In the accompanying drawings, Figure 1 is a sectional view of a filter embodying my improvements. Fig. 2 is a sectional view on the line $x$—$x$ of Fig. 1. Fig. 3 is an enlarged view illustrating the manner of assembling the filter elements, and Fig. 4 is a view in section of a portion of the structure shown in Fig. 3.

1 represents a cylinder which may consist of a section of pipe of comparatively large diameter. This cylinder or pipe section is made with a closed bottom 2 and with a removable top 3,—the latter being secured in place by suitable clamping bolts. At the lower end of the cylinder 1, an outlet pipe 4 communicates therewith and is provided with a suitable valve 5. At a point intermediate of the ends of the cylinder and removed appreciable distances from each of said ends, is an inlet pipe or conveyer 6, by means of which the emulsion or mixture to be filtered enters the cylinder. An outlet pipe 7 for filtered benzin projects through the walls of the cylinder 1 in proximity to the upper end thereof and the inner end of this pipe is connected, by means of suitable coupling devices 8 with the upper end of the filter appliances,—which latter will now be described in detail.

The filtering appliances are located within the cylinder 1 above the inlet 6 and in constructing these devices I employ a pipe section 9 secured at its upper end to the coupling 8 so as to communicate with the pipe 7, and the said pipe 9 is provided in its wall with a plurality of perforations 10, each pair of said perforations being located at diametrically opposite points of the wall of said pipe. During the assembling of the filtering devices (and before the same are placed within the cylinder 1), several rods 11, preferably of wood, are placed at each side of the pipe-section 9 and spaced from the latter and from each other. These wooden rods are provided with alined transverse holes 12 and said holes also aline with the pairs of holes 10 in the pipe 9. Cords 13 are passed through the alining holes of alternate rods 11 and the pipe 9. After the rods 11 and pipe 9 shall have been connected, as above described, by means of the cords 13, the rods and cords will be caused to encircle the pipe 9 and then the structure will appear as shown in Fig. 2 with the spaced rods encircling the pipe 9. This structure is inclosed within a filter bag 14 (such as felt) and the whole is inserted through the top of the cylinder 1 and connected, through the medium of the coupling 8 with the pipe 7,—after which the cover 3 is secured in position on the top of the cylinder and the apparatus is then ready to be operated.

When the cylinder has been supplied with emulsion of benzin and water until said emulsion rises sufficiently in the cylinder to immerse the lower end of the filtering appliances, the benzin contained in the emulsion will be caused by capillary attraction to find its way through the bag 14, the cords 13 and among the wooden rods 11 to the pipe 9, through the holes 10 of which said benzin will enter said pipe 9 and, as the pressure of the fluid entering by the inlet 6 increases, the filtered benzin will rise in the pipe 9 and finally find an outlet through the discharge pipe 7. The natural tendency of the benzin contained in the emulsion in the lower part of the cylinder 1, will be to rise toward the surface of the body of the emulsion and leave the water and other foreign matter in the lower portion of the cylinder, and when the filtering operation shall have been completed, the water and foreign matter can be withdrawn from the bottom of the cylinder through the outlet 4.

Having fully described my invention what I claim as new and desire to secure by Letters Patent, is:

1. In a filter, the combination with a pipe or cylinder provided between its ends with an inlet for fluid to be filtered, of a perforated pipe in the upper portion of said pipe or cylinder, a plurality of rods surrounding said perforated pipe, cords connecting said rods with each other and with the perforated pipe, a filtering medium associated with said rods and means for discharging filtered fluid from said perforated pipe.

2. In a filter, the combination with a cylinder provided with an inlet for liquid to be filtered, of a perforated pipe in the upper portion of said cylinder, a plurality of rods surrounding said perforated pipe and spaced therefrom and from each other, said rods having transverse perforations, cords passing through the perforations of the rods and transversely through said perforated pipe, a filtering medium associated with said rods and means for discharging filtered liquid from the upper end of said perforated pipe.

3. In a filter, the combination with a cylinder provided with an inlet for liquid to be filtered, of a perforated pipe located in said cylinder above said inlet, a plurality of rods surrounding said perforated pipe and spaced therefrom and from each other, said rods having transverse holes, cords passing through said transverse holes in the rods and transversely through the perforated pipe, a bag inclosing said rods and perforated pipe, and an outlet pipe for filtered liquid communicating with the upper end of said perforated pipe.

In testimony whereof, I have signed this specification in the presence of two subscribing witnesses.

MATHEW S. HOPKINS.

Witnesses:
R. S. FERGUSON,
GEO. B. PITT.